United States Patent
Banatre et al.

(10) Patent No.: US 6,901,261 B2
(45) Date of Patent: May 31, 2005

(54) MOBILE TELEPHONY DEVICE AND PROCESS ENABLING ACCESS TO A CONTEXT-SENSITIVE SERVICE USING THE POSITION AND/OR IDENTITY OF THE USER

(75) Inventors: Michel Banatre, La Fresnais (FR); Paul Couderc, Rennes (FR)

(73) Assignee: Inria Institut Nationalde Recherche en Informatique etaen Automatique, Le Chesnay Cedex (FR)

( * ) Notice: Subject to any disclaimer, the term of this patent is extended or adjusted under 35 U.S.C. 154(b) by 529 days.

(21) Appl. No.: 09/912,382

(22) Filed: Jul. 26, 2001

(65) Prior Publication Data

US 2002/0028683 A1 Mar. 7, 2002

Related U.S. Application Data

(63) Continuation-in-part of application No. 09/831,726, filed as application No. PCT/FR00/01350 on May 18, 2000.

(30) Foreign Application Priority Data

May 19, 1999 (FR) .............................. 99 06348
Oct. 3, 2000 (FR) .............................. 00 12611

(51) Int. Cl.$^7$ .............................. H04Q 7/20; H04B 7/00
(52) U.S. Cl. .............................. 455/456.1; 455/456.3; 455/41.2; 455/553.1; 455/11.1
(58) Field of Search .............................. 455/456.1, 456.3, 455/41.2, 41.1, 552.1, 553.1, 557, 556.1, 556.2, 554.1, 555, 11.1

(56) References Cited

U.S. PATENT DOCUMENTS

| 5,533,027 A | * | 7/1996 | Akerberg et al. | ............ 370/347 |
| 5,890,054 A | | 3/1999 | Logsdon et al. | |
| 6,321,257 B1 | * | 11/2001 | Kotola et al. | ............... 709/219 |
| 6,405,049 B2 | * | 6/2002 | Herrod et al. | .............. 455/517 |
| 6,493,550 B1 | * | 12/2002 | Raith | ...................... 455/422.1 |
| 6,505,046 B1 | * | 1/2003 | Baker | ..................... 455/456.3 |

FOREIGN PATENT DOCUMENTS

| EP | 0568 824 A2 | 11/1993 |
| FR | 2 725 579 A | 4/1996 |
| GB | 2 322 262 A | 8/1998 |

* cited by examiner

*Primary Examiner*—Sonny Trinh
*Assistant Examiner*—Huy Phan
(74) *Attorney, Agent, or Firm*—Rabin & Berdo, PC

(57) ABSTRACT

An access interface (Bai) allows access to a context-sensitive service to a user portable set (Ui) according to a chosen geographical coverage. A mobile station (SMi) distributed in the access interface area of coverage is equipped with communication means to establish short-range radio frequency communication within a chosen perimeter. The user portable set (Ui) is equipped with short-range radio frequency communication means paired with those of the mobile station to establish the said short-range radio frequency communication within the chosen perimeter. The user portable set (Ui) communicates with the mobile station (SMi) and the access interface (Bai) to access the said context-sensitive service (Si) which is adapted according to the position and/or identity of the user.

21 Claims, 1 Drawing Sheet

Figure 1:
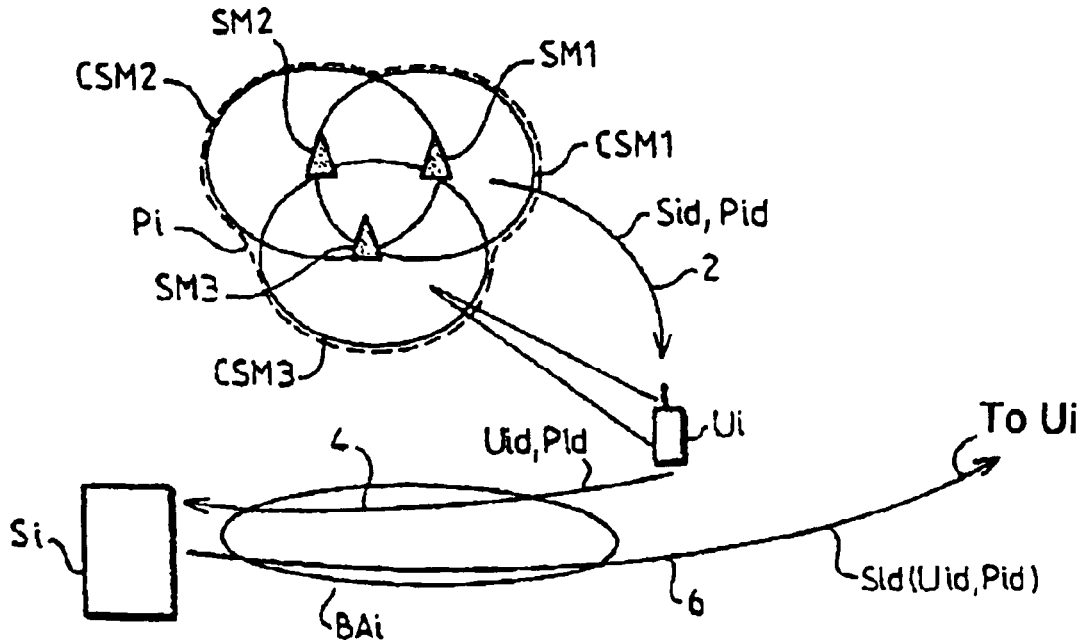

MOBILE TELEPHONY DEVICE AND PROCESS ENABLING ACCESS TO A CONTEXT-SENSITIVE SERVICE USING THE POSITION AND/OR IDENTITY OF THE USER

This application is a continuation-in-part of application Ser. No. 09/831,726, filed May 15, 2001, which is a national stage application of PCT Application Ser. No. PCT/FR00/01350, filed May 18, 2000.

This invention concerns mobile telephony enabling access to a context-sensitive service using the position and/or identity of the user.

It is applicable generally in mobile telephony and more particularly in the location and/or identification of the user in order to offer adapted and adjusted services, in particular with regard to price-setting but also for content, access control and/or availability of the said service.

We already know about solutions which envisage marrying mobile telephony and the GPS (global positioning system) radio navigation system for location and tariff adjustment. However, such solutions are difficult to implement, in particular internally, and are, moreover, limited to static geographical areas.

We also know of solutions which use triangulation on the boundaries defining the cells of a cellular telephone network. However, this type of solution is imprecise.

In international Application PCT/FR00/01350, the Applicant has already proposed a solution based on a different approach in which precise geographical areas are defined and wish which specific services or processes are associated.

In this international Application, use is made in particular of cellular radio telephony and/or short-range radio frequency telephony to define a precise geographical area with adapt and/or adjust, dynamically, without taking out a subscription, at least one application associated with a call, depending on that call in the area covered.

The Applicant posed the problem of operating this solution for any communication infrastructure and any context-sensitive service capable of using the position and/or identity of a user with a portable set to create, control access and/or adjust at least some characteristics of the said service.

This invention provides precisely a solution to this problem.

According to a general definition of the telephony process according to the invention, a) at least one context-sensitive service capable of using the position and/or identity of a user with a portable set is envisaged to create, control access and/or adjust at least some characteristics of the said service.

b) at least one access interface belonging to a chosen communication infrastructure is envisaged, to allow access to the said context-sensitive service to at least one user portable set in accordance with a chosen geographical coverage;

c) at least one mobile station distributed in the access interface area of coverage is envisaged, d) the mobile station is equipped with communication means capable of establishing short-range radio frequency communication within a chosen perimeter between the user portable set and the mobile station, and e) at least one user portable set is equipped with short-range radio frequency communication means paired with those of the mobile station to establish the said short-range radio frequency communication within the chosen perimeter between the portable set and the mobile station.

So thanks to the invention, the user portable set can communicate with the mobile station as well as with the access interface to access the said context-sensitive service adapted according to the position and/or identity of the user.

In practice, at least some characteristics of the context-sensitive service belong to the group formed by the presence/absence, content, availability, access control, pricing of the said service.

Preferably, a communication infrastructure belonging to the group formed by the global cellular network of the GSM, UMTS or similar type, local network of the ad hoc or similar type is envisaged.

In practice a portable set belonging to the group formed by mobile telephones, personal digital assistants or similar is envisaged.

According to another aspect of the invention, plurality of network equipped mobile stations is envisaged.

As a real improvement, the mobile station or plurality of network equipped mobile stations cover(s) practically exactly the interior of a chosen perimeter.

Preferably, a perimeter identifier is attributed to identify the said perimeter, with at least one attribute being associated with each perimeter identifier allowing the user to be located and/or the perimeter to be distinguished.

As an improvement, a list of attributes is associated with each perimeter identifier.

In addition, a service identifier is attributed (for example, URL address type) to enable access to the context-sensitive service so identified.

According to another characteristic of the invention, the mobile station is capable of establishing communication with the access interface, the mobile station thus fulfilling the role of a portable set.

In practice, a user identifier is attributed for each user portable set in order to identify the said user.

When a user with a portable set enters an area covered by the network, the context-sensitive service is adapted according to the user identifier and/or the identifier of the perimeter within which the user portable set is found.

According to a first way of implementing the process in accordance with the invention, a phase is planned for acquiring the service identifier and the perimeter identifier after a short-range radio frequency communication established between the portable set of the user entering within the perimeter and the nearest mobile station, and a phase is planned for application of the context-sensitive service so known by the service identifier after a bi-directional communication established between the user portable set and the access interface.

According to this first implementation method, the service can apply any processing using the user's identity and/or his location and so offer him context-sensitively adapted contents.

According to a second way of implementing the process in accordance with the invention, a phase is planned for acquisition of the user identifier after a short-range radio frequency communication established between the portable set of the user entering within the perimeter and the nearest mobile station, and a phase is planned for application of the context-sensitive service after a communication established between the mobile station and the access interface to announce to the service the presence of the user within the perimeter considered, the service being capable of establishing interaction with the user portable set adapting the content of the said service to the context of the user, thanks to the user identifier and perimeter identifier pair.

According to a third way of carrying out the invention in which a list of attributes and plurality of service identifiers associated with each perimeter identifier is envisaged, the phase for acquisition of the service identifiers and the attributes of the perimeter identifier is carried out after a short-range radio frequency communication established between the portable set of the user entering within the perimeter and the nearest mobile station.

After the phase for acquisition of the service identifiers and the attributes of the perimeter identifier, as an improvement a phase is envisaged for selection of a context-sensitive service after a selection session of the request/answer type between the user portable set and a remote server belonging to the access interface, and in which the selection request includes at least some attributes of the parameter identifier so acquired while the remote server communicates to the user portable set via the access infrastructure all the relevant service identifiers matching the request and from which the user selects the service identifier of his choice.

This invention also aims at a mobile telephony device for implementing the process mentioned above, as well as a user portable set, a mobile station and an access interface intended to co-operate with the said mobile telephony device.

Figure 2:
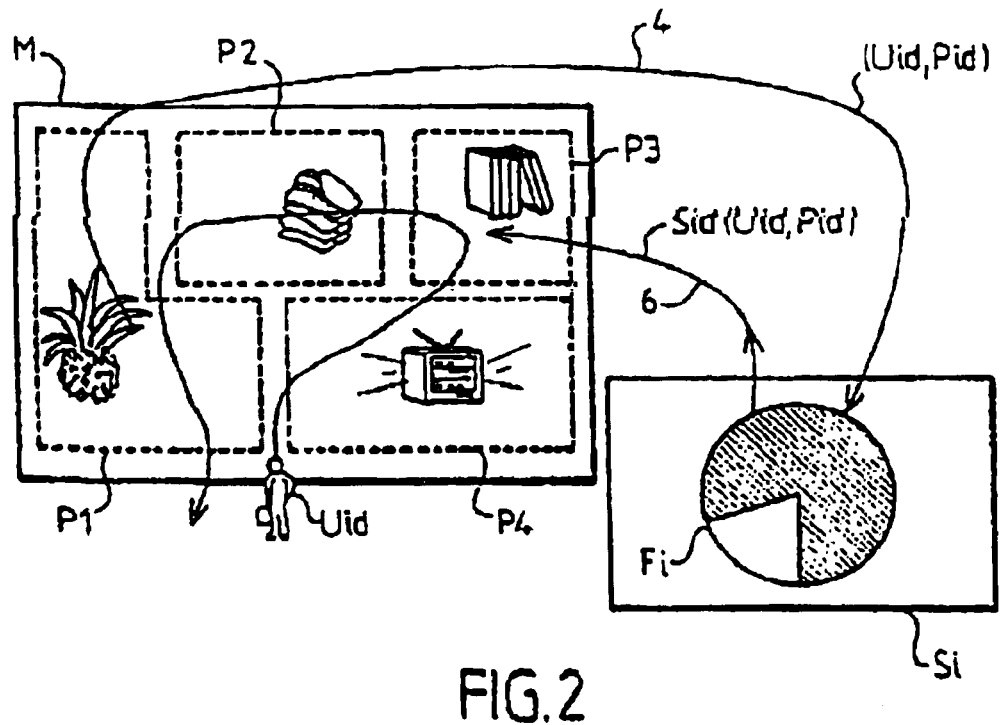

Other characteristics and advantages of the invention will appear in the light of the detailed description below and the drawings in which:

FIG. 1 shows a diagram of the mobile telephony device architecture according to the invention; and FIG. 2 shows a diagram of a client profiling application using the invention's mobile telephony process.

With reference to FIG. 1, a mobile telephony device has been shown which is capable of implementing the mobile telephony process allowing access to a context-sensitive service using the position and/or identity of the user. In FIG. 1, the portable set Ui is located within the perimeter Pi defined by the mobile stations SMi which will be described in more detail below.

For example, a vocal communication between users whose pricing is adjusted by the position of the caller is a context-sensitive service. A context-sensitive service can also be relative to user profiling, a specific or local service, privileged communication between the operator and the user, the supply of documents or web pages answering a request, etc.

According to the invention, a context-sensitive service Si is going to use the position and/or identity of a user holding a portable set to create, control access and/or adjust at least some characteristics of the said service.

In practice, at least some characteristics of the context-sensitive service Si belong to the group formed by the presence/absence, content, availability, access control, pricing of the context-sensitive service Si.

According to the invention, at least one access interface Bai is envisaged, belonging to a chosen communication infrastructure, to allow access to the said context-sensitive service Si to at least one user portable set Ui according to a chosen geographical coverage.

For example, the communication infrastructure belongs to the group formed by a global cellular network of the GSM (global mobile system), UMTS (universal mobile telecommunication system) or similar type, a local network of the ad hoc network type, of which a detailed description will be found below, "Bluetooth" such as the one described in the document "Specification of the Bluetooth system oore" available at the following Url address: http://www.bluetooth.com/developer/specifications/specifications.asp, or a micro-cellular telephony network of the DECT type whose technology is described in the address: http://www.etsi.org/technicalactiv/dect.html.

The communication infrastructure may be of the global type in the sense that it accessible everywhere, or local in the sense that it is only accessible in certain areas.

For example, communication between the mobile station SMi and the access interface Bai is of the GSM/data or GPRS (for general packet radio service) type.

For example, the access interface Bai is capable of propagating (routing) calls from mobile stations SMi to other access interfaces Bai. For that, the access interface Bai is for example, equipped with a "short-range radio frequency" interface which will be described in more detail below and a classical telephone access interface.

The terminals or access interfaces Bai can also be of the WAP (wireless application protocol) type.

According to the invention, in addition at least one SMi mobile station is envisaged distributed in the access interface Bai area of coverage.

With reference to FIG. 1, three mobile stations SM have been shown individualised by SM1 to SM3. The mobile stations SM are equipped in such a way that they cover practically exactly the interior of a chosen perimeter Pi. As a variant, a perimeter Pi may be defined by a single mobile station SMi.

In the example of FIG. 1, the mobile station SM1 has a coverage CSM1, the mobile station SM2 has a coverage CSM2 and the mobile station SM3 has a coverage CSM3. The union of the CSMi coverages of the mobile stations SMi defines here a chosen perimeter Pi.

Movement of at least one mobile station engenders the modification of the perimeter Pi. So, as the applications dictate, the contour of the perimeter can be modified by moving one or several mobile stations. The result is easy and flexible implementation in relation to earlier techniques, in particular those based on the GPS system.

With an ad hoc network which will be described in more detail below, the routing of information between mobile stations is reconfigured dynamically, automatically and practically instantaneously.

Each mobile station SM is capable of establishing short-range radio frequency communication within the associated perimeter Pi, between user portable sets Ui, mobile station(s) SMi and access interface(s) Bai.

User portable sets Ui are, as an improvement, equipped with short-range radio frequency communication means paired with those of the mobile stations SMi. These short-range radio frequency communication means equipping the user portable sets thus enable the establishing of short-range radio frequency communication within the chosen perimeter Pi between the portable set, the mobile station(s) and the access interface(s) Bai.

Mobile stations SMi are thus equipped to create a communication path between the portable set Ui located within the perimeter Pi and the said mobile stations, using the short-range radio frequency communication means available on the mobile stations and the portable sets.

In practice, this ad hoc network type routing can be implemented above the link layer, for example, by the "Wavelan" technology described at the address: http://www.standards.IEEE.org/catalog/IEEE802.11.html or again the "Bluetooth" technology mentioned earlier.

Routing of the ad hoc network can be implemented according to algorithms described in the article "Routing in Ad Hoc Networks of Mobile Hosts, David B. JOHNSON, Computer Science Department, Carnegie Mellon University, Pittsburgh Pa. 15213-3891, Proceedings of the IEEE Workshop on Mobile Computing Systems and Applications, December 1994".

The network's topology is dynamic. It evolves according to the possible movements of the mobile stations and the portable sets. Equipping of the mobile stations is carried out so that there is a path between the portable set Ui and the mobile stations SMi for the perimeter considered.

The mobile stations need a routing function to communicate between themselves within the perimeter considered. This routing function may be dynamic (ad hoc network), that is to say practically transparent and automatic in the eyes of the operator, or else static or manual, that is to say whose routing tables are configured by a network administrator.

In practice, a perimeter identifier Pid is attributed for the said network so formed by the station or plurality of mobile stations covering practically exactly the interior of a chosen perimeter Pi. As will be seen in more detail below, the perimeter identifier Pid enables location of the user and/or characterisation of the perimeter.

Similarly, a service identifier Sid is attributed for the station or network of mobile station SMi. The service identifier Sid may offer access to the services associated with the said network.

Finally, a user identifier Uid is attributed for each user portable set in order to identify the said user.

According to the invention, the context-sensitive service Si is adapted according to the user identifier Uid and/or the identifier of the perimeter Pid, in which the user portable set is found.

The user portable sets may be of the mobile telephone, personal digital assistant or similar type. These devices have both a short-range radio frequency communication interface enabling communication with the networks defined above as well as interface and processing devices enabling access to the context-sensitive services. For example, in the case of a web pages supply service type, the user portable set is equipped with a microprocessor processing unit and memory, as well as a communication protocols stack for access to web pages browsing services, and a browser type application programme to present the pages to the user.

Some portable sets can act as mobile stations if routing protocols are integrated into the portable sets. So, individuals can define a context-sensitive service zone with the help of such a portable set which plays the role of both mobile station and portable set and reciprocally.

With reference to FIG. 1, according to a first method of implementing the mobile telephony process in accordance with the invention, a first phase for acquisition of the service identifier Sid and the perimeter identifier Pid is envisaged after a short-range radio frequency communication 2 (for example ad hoc network) established between the portable set Ui of the user coming into the perimeter Pi and the nearest mobile station SMi. This phase thus allows the acquisition by the portable set of the perimeter identity Pid and the service identity Sid by a communication 2 established between the portable set Ui and the mobile station SMi nearest the latter.

Then a phase is defined for application of the context-sensitive service known by the service identifier Sid after a communication 4 established between the user portable set Ui and the access interface Bai. This communication 4 is for example of the GSM/data or GPRS type.

Finally, a communication 6 (for example of the same nature as that of communication 4) is established between the access interface Bai and the portable set Ui to adapt according to the identity Uid and/or the position of the user Pid, the service Si applied to the user. The context-sensitive service Si applies any processing using the identity of the user Uid and/or of his location Pid and offers thus context-sensitively adapted service characteristics.

The mobile telephony process according to the invention consists therefore of covering a perimeter Pi with which specific processes or services are associated with the aid of a short-range communication network. This short range network is formed by a set of nodes or mobile stations SMi. Therefore a perimeter identifier Pid is associated with this network as well as a service identifier Sid enabling access to services associated with the said perimeter. Each network node knows the identifier Pid and the associated identifier Sid.

As a variant, the network also allows only including the perimeter identifier Pid, in which case the service identifier Sid is configured in the user portable set.

When the service identifier Sid is initially configured in the user portable set, the associated service Si may allow access to other services.

The perimeter identifier Pid allows characterisation of the perimeter or the position of the user (main attribute of the perimeter identifier Pid).

Several services may be associated with one perimeter. It is sufficient for this that the service identifier Sid associated with a chosen perimeter points to a service itself allowing access to several services. It should be noted that these complementary services may be selected dynamically according to the perimeter identifier Pid. This system is analogous to the Internet world in which a URL address allows access to a page giving access to other URLs (hypertext links).

Mobile stations can communicate with other external networks, for example to allow remote definition of Sid identifiers and/or Pid identifiers or again communicating with context-sensitive services if necessary.

The user portable set has a mobile terminal identified uniquely by a subscriber identifier Uid.

Another option for implementing the mobile telephony process according to the invention consists of having the identity of the user Uid present within the perimeter Pi discovered by the mobile stations through a short-range radio frequency communication (for example ad hoc network) between the portable set Ui and the mobile station SMi nearest the latter. The mobile station SMi then establishes a communication with the access interface to access the service. This communication is, for example of the GSM/DATA or GPRS type. It allows the announcing to the access interface, i.e. the service, of the presence of the user distinguished by the identifier Uid in the area considered Pid. The service can then establish interaction with the user by adapting the content of the said service to the user profile thanks to the user identifier Uid and perimeter identifier Pid pair.

Thanks to the process according to the invention, the positioning of the user is sufficiently accurate for numerous applications and that technology is usable as well inside as outside a building.

Installation of a mobile station is simple and above all the definition of perimeters is modifiable at will by simple physical rearrangement of the mobile stations. The mobile station may even be linked to elements of the environment thereby rendering implicit the definition of the zones or perimeters. For example, the mobile stations may be integrated into shop department media, so making it possible to offer context-sensitive services according to the departments, without the need for new configurations when the departments are arranged.

The invention enables exploitation of technologies already available in mobile telephony limiting the cost of the developments necessary. The user identifier Uid/perimeter identifier Pid pair characterises minimally the context to which the user belongs. This pair is linked to a context-sensitive service identified by a service identifier Sid.

The invention is applicable, for example, in the virtual ticket. In this application, when the user goes within the precincts of a railway station, he can consult the board and aim for the train of his choice (according to the timetable and destination). A mobile stations network, for example of the ad hoc type, is installed in the train. When the user gets onto the train, that is to say within the perimeter of the network, the rapid booking service corresponding to the identifier Sid is activated and the user confirms his departure with his portable set. A seat can be allocated to him automatically if it is available and indicated on his portable set. An on-line payment system enables validation of the transaction.

Another of the process's applications according to the invention concerns customer profiling, in particular for a department store or similar (FIG. 2). The perimeters Pi are for example defined in each department (clothing P2, food P1, books P3, electronic apparatus P4). Each time a customer with his user portable set Ui visits the shop M, his profile Fi is updated thanks to the time spent in each department or perimeter Pi. When a promotion concerns a product likely to interest him (because he is currently in department Pi or his profile Fi indicates a lot of time usually dedicated to this type of product), a context-sensitive advertising service Si, corresponding to the service identifier Sid allocated to the department Pi, can inform the client of the promotion by sending him an adapted advertising message.

Currently, a planned achievement method favours a service access infrastructure of the GSM or UMTS type, or other similar cellular telephone network and an ad hoc network using a short-range radio frequency interface such as "Bluetooth" for localisation. However, due to technological evolution and/or the choices of the operators, it may be envisaged using other infrastructures or interfaces, in particular an ad hoc system or similar as a service access infrastructure.

In the description, the identifier Pid is considered until now as an identifier of a perimeter Pi whose contour and geographical position are defined by the radio frequency coverage of one or several mobile stations SMi preferably network equipped. Such an identifier Pid thus enables location of the user when he is within this perimeter Pi.

As a variant, the identifier Pid can also identify and characterise a context associated with the said perimeter. In fact, the geographical position is only one attribute of the said perimeter. The other attributes can thus be the date or the identities of the other mobile entities present nearby.

In this variant, the identifier Pid is therefore constituted by a set of attributes characterising the context Ci associated with the perimeter Pi defined by the presence of the mobile station(s) SMi.

A user portable set Ui then receives the context no longer as a single identifier but as a set of attributes visible at a given moment at a given place.

Considering a set of mobile stations SM1, SM2, SM3, ... SMn with which are associated perimeters P1, P2, P3, ... Pn, it is envisaged according to the invention, making a context Ci correspond to each perimeter Pi.

A context Ci defined by a mobile station SMi is expressed by a series of attributes Aij, with i and j whole numbers.

For example, in the case of a service of the document search on the Internet (web) type, a context is expressed by textual attributes (key words) which define documents corresponding to the context.

In practice, at a given moment and at a given place, a user portable set Ui is within range of a visible set V of mobile stations SM (those which are within communication range), v=(SMh, SMk, ..., SM1).

The context C perceived by a mobile entity (user portable set) is defined by the union of contexts associated with the mobile stations belonging to V, C=Ch U Ck U ... C1.

The description of the context therefore becomes much more accurate than a simple static identifier Pid.

In order to be able to associate identifiers of services or information Sid with a given context, a context interpretation function I may be planned as an improvement.

Function I associates with a context C a set of services connected with C. The interpretation function I may be considered as a selection function.

I:C→(Sid1, Sid2, ... Sidn).

Function I may be similar to the one used for the selection of pertinent documents via a Web search engine, for example google, (http://www.google.com) in which a note is allocated to each document in the collection containing the words in the request. The weight of each word in the request is weighted by its number of occurrences in the document as well as by their position in the document. For example, a word appearing at the start of the document, or in a title, is considered more important. Such an evaluation method is described in detail at the following Url address: http://citeseer.nj.nec.com/balabanovic97adaptive.html.

The weight may also take into account the user profile, determined by the contexts already encountered for example.

A user with which a mobile entity like a mobile telephone or PDA type personal assistant is associated, therefore sees constructed implicitly (by the simple fact of moving) a representation of his current context. The function of interpretation of his current context allows all the services which he may access in his current context to be deduced.

In other words, the user/user portable set pair may be considered as a "cursor" in an information space, the position of the cursor being defined by the attributes of the context (position, date, mobile entities nearby, key words, ...).

For example, in an IT exhibition, each stand has a mobile station SMi describing the stand by means of attributes Aij ("mobile", "wireless", "pda" ... ). A visitor walking around the show is permanently close to several stands, but thanks to its interpretation function, the information corresponding to the most relevant stands to him are posted with priority thanks to an interpretation function which selects the relevant information. This set of information evolves as he moves about (which is similar to browsing on the web).

In other words, a user portable set Ui located within the perimeter Pi of a mobile station SMi discovers the context Ci of the said mobile station after a short-range radio frequency data exchange between the said mobile station and the user portable set. The context Ci is displayed for example on the screen of the user portable set. In response to that display, the user may issue a selection request to a remote server including a search engine. In the event of the user portable set including GSM equipment, the selection request may be communicated through an SMS (Short Message Service) message or according to a WAP request. The search engine then processes the selection request so communicated. All relevant documents (the service identifiers Sid here in the form of a URL address) matching the request are then communicated to the user portable set via a GSM telephonic communication. The user can then select one of the documents (service identifiers Sid) so proposed on the display screen of the user mobile set. After selecting, the user accesses the document (service corresponding to the identifier) so chosen via a telephone communication of the WAP type, for example.

The realisation method described above is preferable when the material calculation power or storage capacity resources are limited on the user portable set. In fact, it is the remote server which carries out the context interpretation function following communication of the context attributes through the service access interface (for example, SMS message or WAP request in the case of GSM equipment).

In the event of the user portable set having a local base capable of containing context-sensitive services or information, it is possible to implement the process in accordance with the invention by using mainly the resources of the user portable set.

In this case the user portable set discovers the context Ci of the said mobile station after a short-range radio frequency data exchange between the said mobile station and the user portable set. The context Ci is displayed, for example, on the screen of the user portable set.

For example, in the case of a zoo where mobile stations SM1 and SM2 are associated respectively with contexts C1 (bird, dog, cat) and C2 (fish, elephant, reptile), the user within range of mobile station SM1 sees the context C1 on his screen. In response to that display, the user may issue a request to the local base of the user portable set containing pre-loaded context-sensitive information. The user's request may concern birds, for example. The search engine connected with the local base then processes the request. All the relevant documents or service identifiers matching the "birds" request are then displayed on the user portable set screen. The user can then select one of the services or documents so proposed on the display screen of the user mobile set. After selecting, the user accesses the service or document chosen contained in the local base. This set of information can change as the user moves around, in particular when he is within range of the mobile station SM2 associated with the context C2.

What is claimed is:

1. Mobile telephony process, comprising:
    a) providing at least one context-sensitive service (Si) adapted to create, control access and/or adjust at least some characteristics of said service according to context data;
    b) providing at least one access interface (Bai) belonging to a chosen communication infrastructure, and having a chosen geographical coverage, for access to said context sensitive service by at least one portable set (Ui);
    c) providing at least one mobile station (SMi) in the chosen geographical coverage of said access interface;
    d) providing said at least one mobile station (SMi) and at least some of said portable sets with respective short-range radio frequency communication means adapted for short-range radio frequency communication with each other, a perimeter (Pi) being associated with the radio coverages of one or more given ones of said short-range communications means;
    e) in response to a particular one of said one or more given short-range radio frequency communication means being within said perimeter (Pi), establishing respective short range communications between said particular radio frequency communications means and said one or more given short-range communication means;
    f) sending attributes associated with said perimeter (Pi) through said short-range communications established at step e); and
    g) submitting said attributes as said context data to said at least one context-sensitive service,
    whereby said context-sensitive service (Si) may be created, access-controlled and/or adjusted according to the physical proximity between said portable sets and said at least one mobile station.

2. Process in accordance with claim 1, wherein said at least some characteristics of the context-sensitive service (Si) belong to a group formed by the absence/presence, content, availability, access control, pricing of the said service.

3. Process in accordance with claim 1, wherein a plurality of network equipped mobile stations (SMi) is provided.

4. Process in accordance with claim 1, wherein said at least one mobile station covers practically exactly the interior of said perimeter (Pi).

5. Process in accordance with claim 4, wherein a perimeter identifier (Pid) is attributed to identify the said perimeter (Pi), at least one attribute (Aij) enabling location of a portable set user/and or characterisation of the perimeter being associated with each perimeter identifier (Pid).

6. Process in accordance with claim 5, wherein with each perimeter identifier (Pid) is associated a list of attributes (Aij).

7. Process in accordance with claim 6, wherein acquisition of the attributes (Aij) of the perimeter identifier (Pid) and of the associated service identifiers (Sid) is performed after a short-range radio frequency communication (2) is established between the user portable set (Ui) coming within the perimeter (Pi) and the nearest mobile station (SMi).

8. Process in accordance with claim 7, wherein selection of a context-sensitive service is performed after a request/answer type selection session between the user portable set (Ui) and a remote server belonging to the access interface (Bai), and in which the selection request includes at least some attributes (Aij) of the parameter identifier (Pid) so acquired while the remote server communicates to the user portable set via the access infrastructure all the relevant service identifiers matching the request and from which the user selects the service identifier (Sid) of his choice.

9. Process in accordance with claim 5, wherein a service identifier (Sid) is attributed, in particular of URL address type or similar to enable access to the service associated with the said perimeter (Pi).

10. Process in accordance with claim 5, wherein acquisition of the service identifier (Sid) and the perimeter identifier (Pid) is performed after a short-range radio frequency communication (2) is established between the portable set (Ui) coming within the perimeter (Pi) and the nearest mobile station (SMi).

11. Process in accordance with claim 10, wherein application of the context-sensitive service thus known by the service identifier (Sid) is performed after a bidirectional (4 and 6) communication is established between the portable set (Ui) and the access interface (Bai).

12. Process in accordance with claim 5, wherein acquisition of the user identifier (Uid) is performed after a short-range radio frequency communication is established between the user portable set (Ui) coming within the perimeter (Pi) and the nearest mobile station (SMi), and wherein application of the context-sensitive service is performed after communication is established between the mobile station and the access interface to announce to the service (Si) the presence of the user within the perimeter considered (Pi), the service being capable of establishing interaction with the user portable set by adapting the content of the said service according to the user profile based on the user identifier (Ui) and perimeter identifier (Pid) pair.

13. Process in accordance with claim 1, wherein said at least one mobile station (SMi) is capable of establishing communication with the access interface (Bai), the mobile station (SMi) thus fulfilling the role of a portable set.

14. Process in accordance with claim 1, wherein a user identifier (Uid) is attributed for each portable set in order to identify a user thereof.

15. Process in accordance with claim 14, wherein the context-sensitive service is adapted according to the user identifier (Uid) and/or the identifier of the perimeter (Pid) in which the portable set is located.

16. Process in accordance with claim 1, wherein the communication infrastructure belongs to a group formed by the global cellular network of the GSM, UMTS or similar type, ad hoc local network or similar.

17. Process in accordance with claim 1, wherein the portable set belongs to the group formed by mobile telephones, personal digital assistants (PDA) or similar.

18. Mobile telephony device for the implementation of the process in accordance with claim 1.

19. User portable set intended for co-operating with the mobile telephony device in accordance with claim 18.

20. Mobile station intended for co-operating with the mobile telephony device in accordance with claim 18.

21. Access interface intended for co-operating with the telephony device in accordance with claim 18.

* * * * *